(12) United States Patent
Metzler et al.

(10) Patent No.: US 7,480,564 B2
(45) Date of Patent: Jan. 20, 2009

(54) SYSTEM FOR DETERMINING THE RELATIVE POSITION OF A SECOND FARM VEHICLE IN RELATION TO A FIRST FARM VEHICLE

(75) Inventors: Patrick Metzler, St. Wendel (DE); Werner Flohr, Kaiserslautern-Dansenberg (DE); Michael Höh, Rieschweiler-Mühlbach (DE)

(73) Assignee: Deere & Company, Moline, IL (US)

( * ) Notice: Subject to any disclaimer, the term of this patent is extended or adjusted under 35 U.S.C. 154(b) by 547 days.

(21) Appl. No.: 11/201,544

(22) Filed: Aug. 11, 2005

(65) Prior Publication Data
US 2006/0047418 A1 Mar. 2, 2006

(30) Foreign Application Priority Data
Aug. 14, 2004 (DE) .................. 10 2004 039 460

(51) Int. Cl.
*G01C 21/36* (2006.01)
(52) U.S. Cl. .................. 701/207; 701/200; 701/50
(58) Field of Classification Search .......... 701/200, 701/207, 213–215, 96, 50; 340/988, 435–437; 342/357.06, 357.12
See application file for complete search history.

(56) References Cited

U.S. PATENT DOCUMENTS 5,999,126 A 12/1999 Ito .................. 342/357.1
6,292,725 B1 * 9/2001 Kageyama et al. .......... 701/30

FOREIGN PATENT DOCUMENTS

| DE | 196 24 719 A1 | 1/1998 |
|---|---|---|
| DE | 197 05 842 A1 | 8/1998 |
| DE | 100 57 374 A1 | 6/2002 |
| DE | 100 64 860 A1 | 6/2002 |
| DE | 100 64 862 A1 | 7/2002 |
| DE | 101 29 133 A1 | 12/2002 |
| DE | 101 29 135 A1 | 12/2002 |
| DE | 102 24 939 A1 | 1/2004 |
| DE | 102 50 694 B3 | 2/2004 |
| EP | 0 604 404 B1 | 6/1998 |
| EP | 0 956 522 B1 | 5/2002 |
| JP | 04 101 206 | 4/1992 |
| JP | 04 134 212 | 5/1992 |
| JP | 04 174 389 | 6/1992 |

OTHER PUBLICATIONS

"Elektronik als Hofknecht (Electronics used as Court Servants)", Landtechnik Mar. 2000, p. 256 f.
G. Wallmann and H.-H. Harms, "Assistenzsystem zur Überladung landwirtschaftlicher Güter (Support System for transferring agricultural goods)", Landtechnik Jun. 2002, p. 352 f.

* cited by examiner

Primary Examiner—Yonel Beaulieu

(57) ABSTRACT

A system for determining the relative position of first and second farm vehicles, each equipped with a satellite-supported position sensing device. A data transmission link transmits position data between the vehicles, and a computer on one of the vehicles determines data with respect to the relative position of the vehicles. A control device responsive to satellite signal quality assures that the two position sensing devices operate in the same reception modes for improved accuracy.

19 Claims, 3 Drawing Sheets

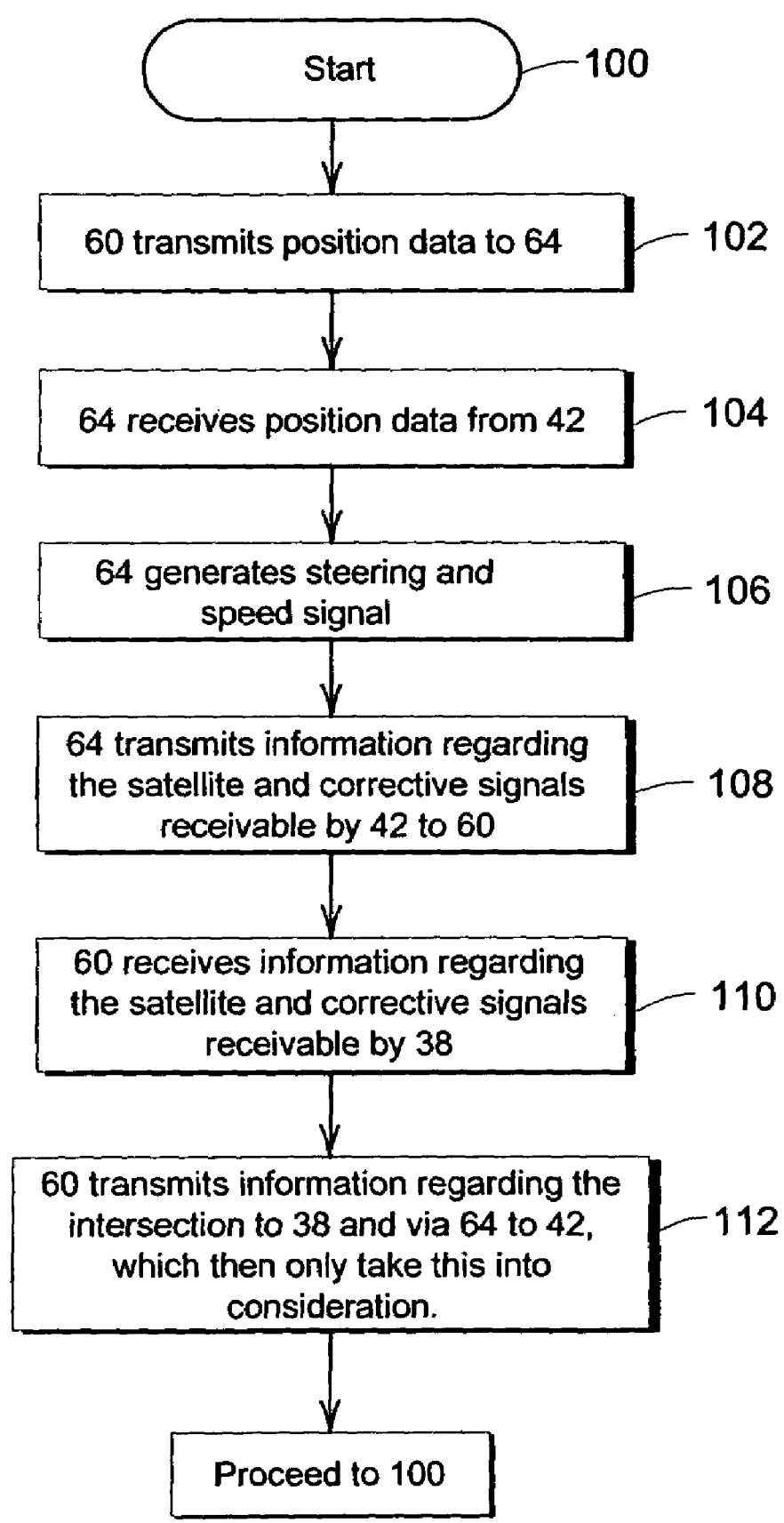

SYSTEM FOR DETERMINING THE RELATIVE POSITION OF A SECOND FARM VEHICLE IN RELATION TO A FIRST FARM VEHICLE

FIELD OF THE INVENTION

The invention relates generally to a system for determining the relative position of a second farm vehicle in relation to a first farm vehicle, wherein the first vehicle and the second vehicle are equipped to perform jointly an operation on a field that is to be cultivated. The first vehicle contains a first satellite-supported position sensing device equipped to receive signals from several satellites and to provide position data of the first vehicle. The second vehicle contains a second satellite-support position sensing device equipped to receive signals from several satellites and to make position data of the second vehicle available. A data transmission connection exists between the first vehicle and the second vehicle, and the position data of the first vehicle can be transmitted to a computer of the second vehicle or vice versa. The computer provides data with respect to the relative position of the second vehicle relative to the first vehicle based on the position data of the first vehicle and the position data of the second vehicle.

BACKGROUND OF THE INVENTION

In the past it has been frequently suggested to have two farm vehicles travel on parallel paths, wherein the first vehicle (master) is steered by an operator or automatically and the second vehicle (slave) is automatically kept on a track of travel parallel next to or behind the first vehicle. Both vehicles can perform a cultivation operation or the second vehicle can serve as the transport vehicle for the crop harvested by the first vehicle. By way of example reference is made to the following publications: "Elektronik als Hofknecht (Electronics used as Court Servants)", Landtechnik 3/2000, pgs. 256 f; G. Wallmann and H.-H. Harms, "Assistenzsystem zur Überladung landwirtschaftlicher Güter (Support System for transferring agricultural goods)", Landtechnik 6/2002, pgs. 352 f; DE 197 05 842 A, DE 100 57 374 A, DE 100 64 860 A, DE 100 64 862 A, DE 102 24 939 A, EP 956 522 B, and JP 04 101 206 A.

At least two types of transmission have been suggested for transmitting steering information from the first to the second vehicle. On one hand, steering data in the form of speed and directional data can be transmitted from the first vehicle to the second vehicle (see DE 100 64 860 A and JP 04 101 206 A), but this type has the disadvantage that possible errors in the directional and speed specifications to the second vehicle add up over time to large errors in the position information so that parallel travel is not always guaranteed.

On the other hand, it is possible (see Wallmann, loc. cit., DE 100 64 862 A, DE 102 24 939 A and EP 956 522 B) to equip both vehicles with a satellite-supported position capturing system, especially with GPS receivers, and establish a data transmission connection between the two vehicles. In this type, the first vehicle informs the second vehicle of the respective position of the first vehicle. Based on that data and the output of the position capturing system of the second vehicle, the relative position is calculated by forming the difference between the two absolute positions based on which a steering and/or speed signal is generated for the second vehicle.

Satellite-supported position capturing systems such as GPS, Glonass or the future Galileo employ several satellites located in an earth orbit and equipped with atomic clocks, which emit the electromagnetic (radio) waves containing time and identity or location information, respectively. The corresponding receivers have to receive the signals of at least three satellites, respectively, in order to be able to determine the current position in space. If the current time is also to be determined, signals from four satellites must be received. Position sensing accuracy increases with the number of satellites. The accuracy of the position sensing systems is commonly improved through the reception of radio signals containing corrective data emitted by reference stations in known locations.

In the case of slave vehicles steered on the basis of position capturing systems, errors in the absolute positions occurring during the subtraction operation are eliminated as long as the same reception conditions exist for both receivers and they hence use signals of the same satellites. The relative position then is sufficiently accurate. If different reception conditions for the two receivers exist, caused for example by the shading of one satellite for the first receiver (e.g., on the edge of a field covered by trees where the vehicle travels) while the second vehicle travels further inward in the non-shaded center of the field, errors result in the relative position which can lead to undesirable erroneous steering processes of the second vehicle.

It has further been suggested to detect the quality of signals of satellite-supported position capturing system and if the quality is not sufficient for sufficiently accurate position sensing, to determine the position based on other means, such as radio waves (U.S. Pat. No. 5,999,126 A), sensors for detecting a crop boundary (DE 101 29 133 A, DE 101 29 135 A) or inertial navigation systems (EP 0 604 404 A, JP 04 134 212 A). These means, however, are only provided for a single vehicle and cannot solve the problem of different reception conditions of two receivers.

It is suggested in JP 04 174 389 A to equip a vehicle with two satellite antennas. For a single satellite the better suited antenna is selected, respectively, in order to obtain as accurate a position signal as possible. This as well cannot solve the problem of different reception conditions of receivers on two vehicles.

SUMMARY OF THE INVENTION

It is therefore an object of the present invention to provide a position sensing system in which the afore-mentioned problems no longer exist or exist to a lesser extent.

The problems are resolved pursuant to the invention through structure wherein a data link exists between the first vehicle and the second vehicle. The position data of the first vehicle can be transmitted to a computer of the second vehicle or vice versa, and the computer can be operated such that it can determine data with respect to the relative position of the second vehicle in relation to the first vehicle based on the position data of the first vehicle and the position data of the second vehicle. The position sensing devices of both vehicles provide information regarding the quality of the signals of the respectively received satellites to a control device, and the control device can be operated so that the two position sensing devices are in the same reception modes.

The invention relates to a system for determining the relative position of two farm vehicles, which jointly operate in a field and are equipped with position sensing devices. A computer on one of the two vehicles receives position data from both position sensing devices and uses the received data to determine data regarding the relative position of the two vehicles. Based on the data, steering and/or speed signals can be generated which can be used to operate the second vehicle automatically and possibly without an operator. Alternatively, a driver signal can be provided which may include specific displayed values useful to coordinate the operations of the two vehicles. The position data is transmitted from one vehicle to a computer equipped vehicle, via a wireless data transmission connection operating by means of radio, sound or light waves.

In order to prevent possible errors in position sensing due to different reception conditions of the receivers of the two position sensing devices, it is suggested that information about the quality of the satellites' signals received by the two position sensing devices be fed to a control device. This information can indicate which of the satellites can even receive information, or it can indicate the field strength or error rate of the signals. The control device is located on board of one of the vehicles and receives the aforementioned information in a wireless fashion from the position sensing device of the other vehicle. The above-mentioned data transmission connection can be used, which then operates bi-directionally. Based on the information regarding the quality of the signals, the control device prompts both position sensing devices to operate in the same reception modes. Here preferably only those satellites are considered, which can be received by both position sensing devices. In another embodiment, the signals of the individual satellites are considered in a weighted fashion as a function of their quality, in particular in the same fashion by both position sensing devices. The control device can be integrated into one of the position sensing devices or can communicate with the position sensing devices as a separate element.

The above structure assures that both position sensing devices operate in the same reception mode to thereby prevent errors in the determined relative position caused by differing numbers or signal qualities of the satellites received by the position sensing devices. The fact that under certain circumstances the accuracy of the absolute positions can be reduced has no negative effect here.

For certain applications, however, a relatively accurate absolute position is required. Examples include automatic steering of the first vehicle on the basis of a road map and the position of the first vehicle as determined by the first position sensing device; crop mapping; the documentation of work processes, such as the tractive force applied during cultivation of the soil or the sowing depth; or of spreading processes, such as the amount of fertilizer or seeds that was spread. It is therefore useful to switch the respective position sensing device alternately between two modes of operation. This way operation occurs alternately in a reception mode, as that specified by the control device (i.e., possibly fewer satellites considered in the position determination than can in fact be received), and in a reception mode in which the maximum available position accuracy is achieved by considering all satellites that can be received. If both position sensing devices receive the same satellites, they operate only in that mode in which all receivable satellite signals are considered for position determination.

The reception conditions taken into consideration by the control device are not limited to whether or not a satellite can be viewed. They can also include the quality of corrective data or the like and can be used for appropriately actuating the position sensing devices. If the corrective signal in one position sensing device is poor, accordingly the corrective signals in both position sensing devices remain unconsidered. Also preliminary results during position data calculation can be adjusted.

The control device can also switch one or both position sensing devices to a different mode in case of poor reception conditions, e.g., into an inertial navigation operation in which the position is determined, for example, with a gyro compass or the like and a propulsive speed sensor.

The determined positions can also be fed to the control device. Plausibility tests can then be performed or emergency programs activated to issue warning notices to an operator or a spaced monitoring station to prevent an imminent collision.

The control device can also instruct a position sensing device to shift its position data in a specified direction in order to compensate for determined errors.

These and other objects, features and advantages of the present invention will become apparent from the description which follows in view of the drawings.

BRIEF DESCRIPTION OF THE DRAWINGS

FIG. 3 is a system flow chart for determining the relative position of the second vehicle in relation to the first vehicle.

DESCRIPTION OF THE PREFERRED EMBODIMENT

Figure 1:
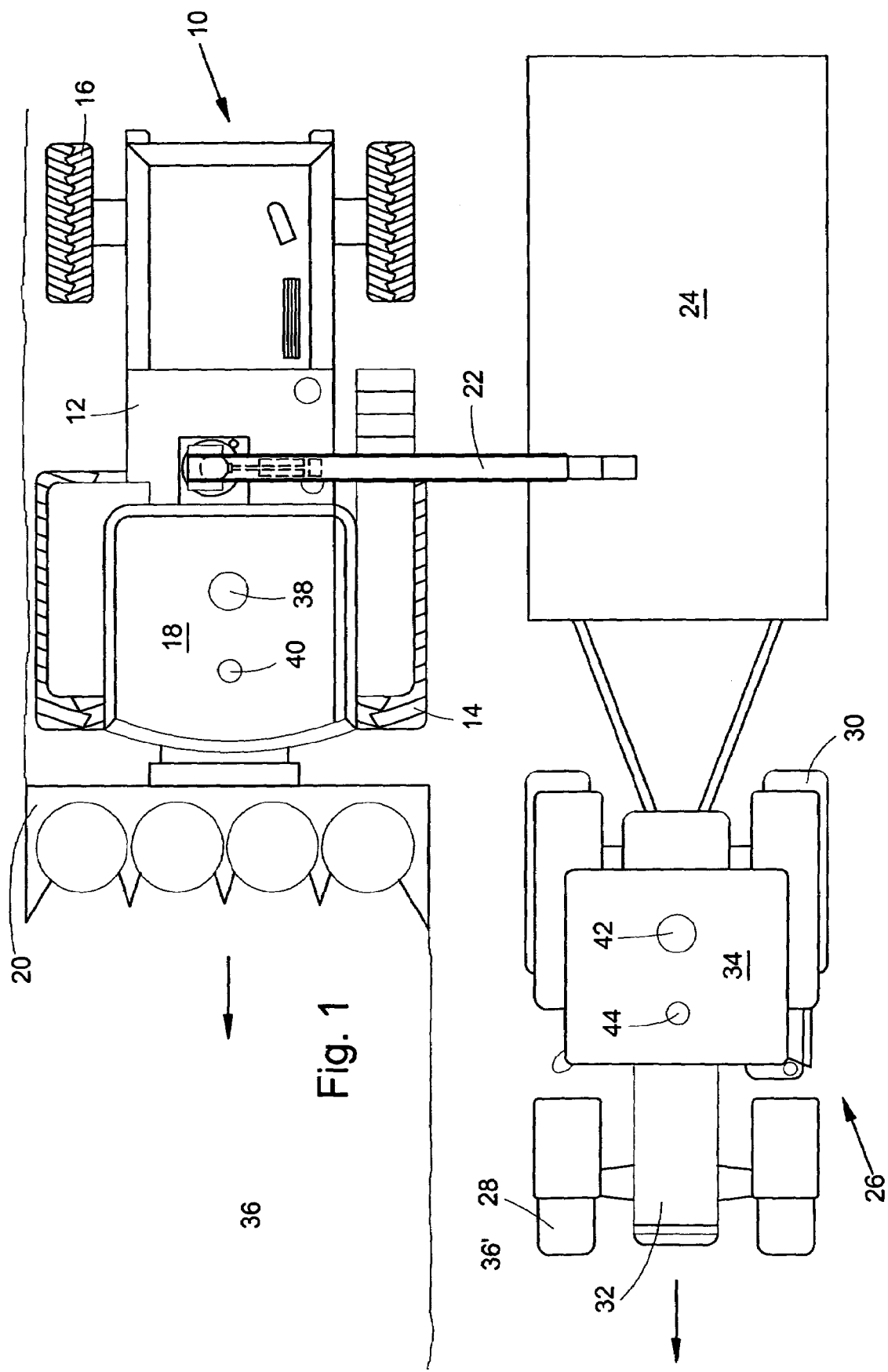
FIG. 1 is a diagrammatic top view on two farm vehicles, which jointly perform a harvesting and transferring operation on a field.

A first farm vehicle 10 being a type of automated crop chopper shown in FIG. 1 is constructed on a frame 12, supported by front-driven wheels 14 and steerable rear wheels 16. The harvester 10 is operated from a driver's cab 18, from which a crop receiving device 20 can be viewed. The crop receiving device 20, the Crop such as corn, grass or the like is picked up from the ground by the crop receiving device 20 and is fed to a chopper drum, which shreds the crop and passes it on to a conveying device. The crop is conveyed from the vehicle 10 to a trailer 24 traveling next to the vehicle via a discharge auger or conveyor 22 that can pivot about a vertical axis.

The trailer 24 is pulled by a second farm vehicle 26 shown as a tractor, which includes front steerable wheels 28 and rear-driven wheels 30 rotatably mounted on and supporting a frame 32 having a driver's cab 34.

The first vehicle 10 harvests plants from a field 36, corn in the illustrated example, which is picked up by the crop receiving device 20 implemented as a corn head. The second vehicle 26 travels on the harvested part 36' of the field parallel to the first vehicle 10 in such a position that the plants shredded in the first vehicle 10 can reach the trailer 24 via the discharge conveyor 22. The second vehicle 26 therefore must always travel parallel and next to the first vehicle 10; especially when turning into the field. The second vehicle 26 can also travel behind the first vehicle 10 when no harvested part 36' of the field 36 exists yet on which the second vehicle 26 could travel without damaging the plants located there.

The first vehicle 10 is steered by a driver sitting in the driver's cab 18 or by a conventional automatically operating steering device. The automatic steering device can include a mechanical plant feeler structure which follows individual plants, or an optical image processing, or a laser or ultrasound sensor for detecting the boundary between the part of the field 36 containing the plants and the harvested part 36'. An automatic steering system based on the position data of a position sensing system 38 of the first vehicle 10 in conjunction with a road map can also be used. The second vehicle 26 is likewise equipped with a steering device, which is illustrated in more detail below, to facilitate and/or automate parallel travel to the first vehicle 10.

The first vehicle 10 could also be another one of a number of other types of automated harvester, such as a combine or beet harvester. The invention can also be used in any other types of farm vehicles which cultivate a field as two or more units. Examples include several combines that travel next to each other and fertilizer distributors or ground cultivators, which can travel in any random relative configurations across the field 36.

The first vehicle 10 is equipped with a first position sensing device 38, which is arranged on the roof of the cab 18. A first radio antenna 40 is also positioned on the roof. The second vehicle 26 is equipped with a second position sensing device 42, which is located on the roof of the cab 34. A second radio antenna 44 is positioned on the roof of the second vehicle 26.

Figure 2:
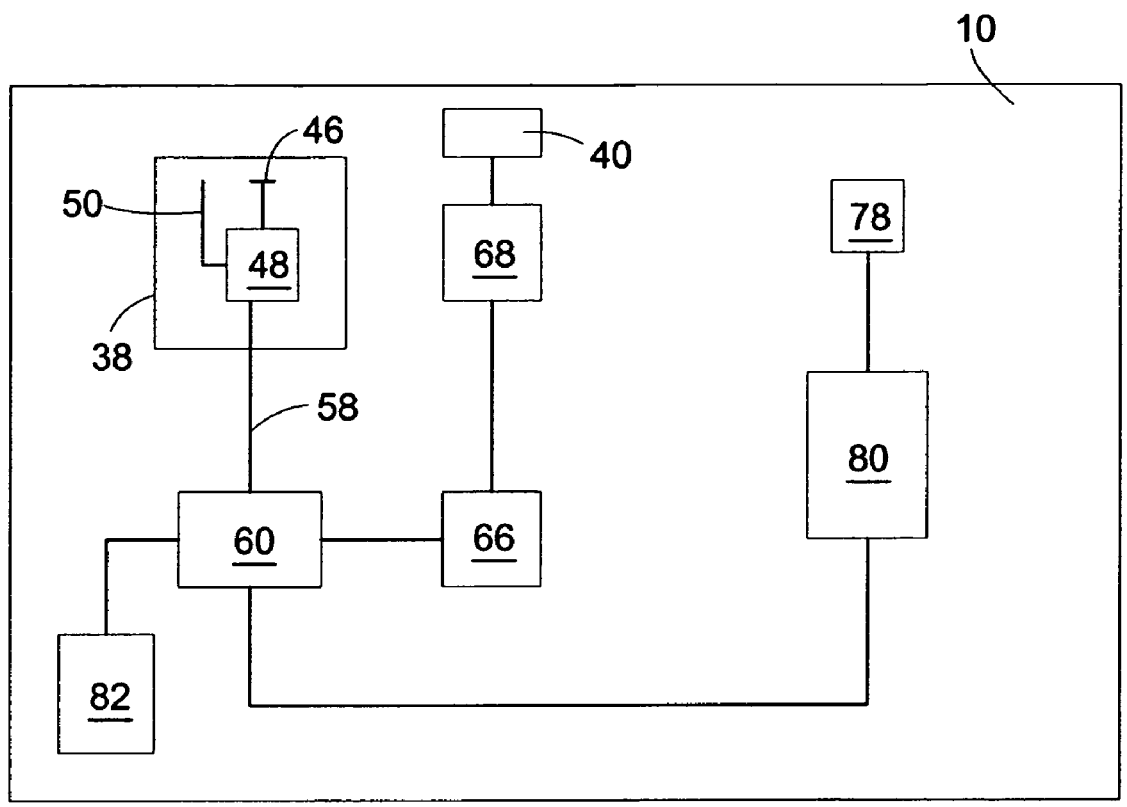
FIG. 2 is a diagrammatic view of the position sensing devices of the two vehicles of FIG. 1 along with interacting elements.
Figure 2:
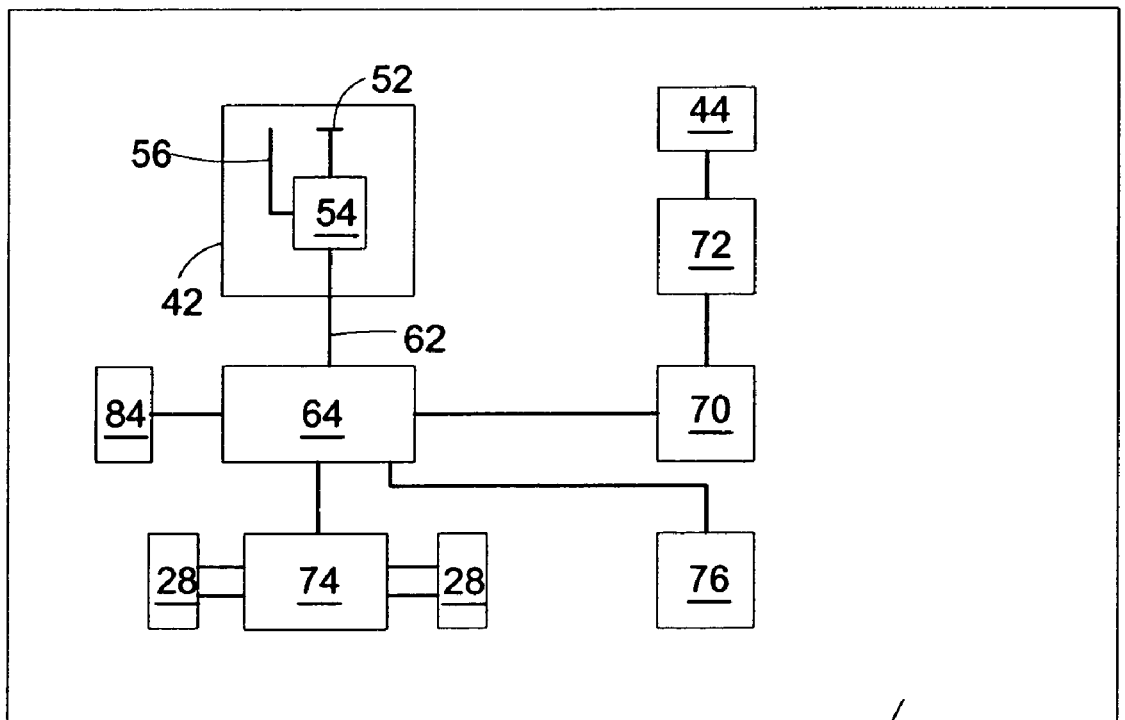

Reference is now made to FIG. 2, which diagrammatically illustrates the individual components of the position sensing devices 38, 42 and the steering devices of the second vehicle 26. The first position sensing device 38 on board of the first vehicle 10 includes an antenna 46 and an evaluating circuit 48 connected to the antenna 46. The antenna 46 receives signals from the satellites of a position sensing system, such as GPS, Galileo or Glonass, which are fed to the evaluating circuit 50. Based on the signals from the satellites, the evaluating circuit 48 determines the current position of the antenna 46. The evaluating circuit 48 is also connected to a corrective data reception antenna 50 which receives radio waves emitted by reference stations in known locations. Based on the radio waves, the evaluating circuit 48 generates corrective data to improve the accuracy of the position sensing device 38.

The evaluating circuit 48 transmits first position data to a first control device 60 via a bus line 58. The bus line 58 also conveys information regarding the identity of the satellites that can be received at the respective times. The field strength on the corrective data reception antenna 50 is transmitted to the control device 60.

The control device 60 is connected via an interface 66 to a transmit-receive device 68, which in turn is connected to the radio antenna 40. The transmit-receive device 68 receives and generates radio waves, which are received or emitted by the antenna 40. The second position sensing device 42, which includes an antenna 52 and an evaluating circuit 54 connected to the antenna 52, is located on board of the second vehicle 26. The antenna 52 receives signals from satellites of the same position sensing system as the antenna 46. The satellite signals are fed to the evaluating circuit 54. Based on the signals from the satellites, the evaluating circuit 54 determines the current position of the antenna 52. The evaluating circuit 54 is also connected to a corrective data reception antenna 56 which receives radio waves emitted by reference stations in known locations. Based on the radio waves, the evaluating circuit 54 generates corrective data for improving the accuracy of the position sensing device 42.

The evaluating circuit 54 transmits a second set of position data to a computer 64 via a bus line 62. The bus line 62 transmits information to the computer 64, including information regarding the identity of the satellites that can be received at the respective times and information on the field strength of the corrective data reception antenna 56.

The computer 64 is connected via an interface 70 to a transmit-receive device 72, which in turn is connected to the radio antenna 44. The transmit-receive device 72 receives and generates radio waves, which are received or emitted by the antenna 44. Through the transmit-receive devices 68, 72 and the radio antennas 40, 44 data can be transmitted from the control device 60 to the computer 64 and from the computer 64 to the control device 60. The connection between the antennas 40, 44 can be a direct one, e.g., in an approved radio frequency such as CB radio or the like, or it can be established via one or more relay stations, for example when the transmit-receive devices 68, 72 and the radio antennas 40, 44 operate based on the GSM standard or another suitable standard for cellular telephones.

The flow chart in FIG. 3 shows the operation of the system for determining the relative position of the second vehicle in relation to the first vehicle. In operation, after starting in step 100, the control device 60 transmits position data of the first vehicle 10 generated by the first position sensing device 38 to the computer 64 of the first vehicle 26 (step 102) at regular intervals, for example, every 100 ms. The computer 64 receives the simultaneously determined or approximately simultaneously determined position data of the second vehicle from the second position sensing device 42 (step 104). Thereafter, the computer 64 determines in step 106 the difference between the two positions and compares the difference to a target value expedient for proper filling of the trailer 24. Steering signals generated based on the comparison steering signals are fed to an automatic steering device 74, which is equipped to specify the position of the steerable wheels 28 of the vehicle 26. Additionally, based on the afore-mentioned comparison, the computer 64 generates speed signals and transmits them to a speed specification device 76 which regulates the speed of the second vehicle 26 by varying the engine rotational speed of the second vehicle 26 and/or the gear ratio. The target value for the difference in the positions of the two vehicles 10, 26 can be firmly specified in the computer. Alternatively, the target value is determined based on stored and/or transmitted vehicle data or is programmed (taking into consideration the respective position data of the two vehicles 10, 16) into the computer after a calibrating input by the operator of one of the two vehicles 10 or 26 after the vehicles have been brought into a suitable relative position.

A further feature is possible wherein only the steering device 74 is activated automatically, while the operator regulates the speed input device 76. In this way, the entire trailer 24 can be filled gradually. A further possible feature would be to facilitate operator regulation of the steering device 74 and the speed input device 76 and provide a target value signal to the operator through the computer 64.

In order to ensure that both position sensing devices 38 and 42 operate under the same operating conditions, the computer 64 transmits in step 108 information regarding the identity of the satellites that can be received with the antenna 52 at the respective times and the field strength on the corrective data reception antenna 56 to the control device 60 via the bidirectional data transmission connection by means of the antennas 40, 42. The control device 60 also receives in step 110 corresponding data for the antenna 46 and the corrective data reception antenna 50. The control device 60 compares in step 112 the data and transmits information regarding the intersection of receivable satellites to the evaluating circuit 48 and, via the data transmission connection and the computer 64, to the evaluating circuit 54. The evaluating circuits 48 and 54 are instructed to take into consideration only signals from satellites that both antennas 46 and 52 can receive when calculating the position data. This way, errors in the position data, which can be caused by different satellites taken into consideration in the position determination, can be prevented. Subsequently the procedure is begun again with step 100.

In addition, the evaluating circuits 48 and 54 only take into consideration corrective signals from the corrective data reception antennas 50 and 56 when both receive sufficient field strengths. The control device 60 makes a decision based on the field strength data available and transmits corresponding instructions to the evaluating circuits 48 and 54.

The first vehicle 10 includes a throughput measuring device 78 which measures, for example, the vertical distance between two prepress rollers which are arranged upstream from the chopper drum. A storage device 80 is connected to the throughput measuring device 78 and serves the georeferenced mapping of the readings of the throughput measuring device 78. In order to obtain information about the appropriate position of the first vehicle 10, the storage device 80 is connected to the control device 60. When the storage device 80 signals to the control device 60 for position data that is required, the control device 60 prompts the evaluating circuit 48 in the meantime to make available position data based on all receivable satellites. The position data is then transmitted to the storage device 80 rather than the control device 64.

The control device 60 is also connected to an inertial navigation system 82, and the computer 64 is connected to an inertial navigation system 84. If the number of different satellites receivable is insufficient to generate position data, the control device 60 transmits the output data of the inertial navigation system 82 to the computer 64 which based on the output data of the inertial navigation systems 82 and 84 and the last available reliable position data from the position sensing devices 38, 42 determines the relative positions of both vehicles 10, 26 and transmits corresponding steering and speed specification signals to the steering device 74 and the speed specification device 76. The output data of the inertial navigation system 82 can also serve as position data for the storage device 80, if necessary.

Having described the preferred embodiment, it will become apparent that various modifications can be made without departing from the scope of the invention as defined in the accompanying claims.

The invention claimed is:

1. A system for determining the relative position of a second vehicle in relation to a first vehicle, wherein the first vehicle and the second vehicle include equipment to jointly perform an operation on a field, the system comprising:
   the first vehicle including a computer and a first satellite-supported position sensing device and having a receiver for receiving signals from several satellites in one or more reception modes and structure for providing first position data for the first vehicle;
   the second vehicle including a computer and a second satellite-supported position sensing device for receiving signals from several satellites in one or more of the reception modes and structure for making position data of the second vehicle available;
   a data transmission connection between the first vehicle and the second vehicle for transmitting the position data of the first vehicle to the computer of the second vehicle or vice versa;
   the computer of the second vehicle operable to determine data with respect to the relative position of the second vehicle in relation to the first vehicle based on the position data of the first vehicle and the position data of the second vehicle;
   a control device for receiving signal quality information, wherein the position sensing devices of both vehicles provide information quality signals indicative of the quality of the signals of the respectively received satellites to the control device, and wherein the control device is responsive to the information quality signals such that the two position sensing devices operate in the same reception mode or uniform reception modes; and
   a reception device for receiving corrective data from reference stations in known locations, wherein the control device is responsive to information regarding quality of the corrective data to improve accuracy of the position sensing devices, wherein the control device is operable to prompt the position sensing devices to use the same reception mode or the uniform reception modes for the corrective data.

2. The system set forth in claim 1, wherein the position sensing devices of both vehicles include transmission structure for transmitting information regarding receivable satellite signals to the control device, the control device operable such that the two position sensing devices transmit information regarding the intersection of receivable satellites and the position sensing devices operable such that their position data is generated only on the basis of signals of satellites belonging to the intersection respectively.

3. The system set forth in claim 1, wherein the first and second sensing devices are alternately operable to emit position signals based on all receivable satellites.

4. The system set forth in claim 3, wherein the position signals based on all receivable satellites are used for absolute position data applications, based on, including one or more of the following:
   automated steering of the first vehicle, mapping processes of harvesting, tillage operations, and spreading operations.

5. The system set forth in claim 1, wherein the control device is operable to compare preliminary results of both position sensing devices when calculating the position data.

6. The system set forth in claim 1, wherein the control device is operable to switch one or both position sensing devices into a satellite-independent position sensing mode comprising an inertial navigation mode in case of unsuitable reception conditions.

7. The system set forth in claim 1, wherein the control device receives position data from the first and second position sensing devices and compares said data to generate a plausibility and/or imminent collision warning signal in the event of implausible position determinations and/or imminent vehicle collision, respectively.

8. The system set forth in claim 1, wherein the control device is connected to one or both of the position sensing devices to provide corrective data for the position sensing devices.

9. The system set forth in claim 1, wherein the computer generates steering signals based on data regarding the relative position of the second vehicle to the first vehicle, wherein said signals are usable for manually and/or automatically steering the second vehicle.

10. The system set forth in claim 1, wherein the computer generates speed signals based on data regarding the relative position of the second vehicle to the first vehicle for providing a speed specification for an operator and/or for the automated speed control of the second vehicle.

11. A system for determining the relative position of a second vehicle in relation to a first vehicle, wherein the first vehicle and the second vehicle include equipment to jointly perform an operation on a field, the system comprising:
   the first vehicle including a computer and a first satellite-supported position sensing device and having a receiver for receiving signals from several satellites in one or more reception modes and structure for providing first position data for the first vehicle;
   the second vehicle including a computer and a second satellite-supported position sensing device for receiving signals from several satellites in one or more of the reception modes and structure for making position data of the second vehicle available;

a data transmission connection between the first vehicle and the second vehicle for transmitting the position data between the vehicles, wherein the computer of the second vehicle includes means for determining data with respect to the relative position of the second vehicle in relation to the first vehicle based on the position date of the first vehicle and the position data of the second vehicle;

a control device receiving signal quality information, wherein the position sensing devices include means for providing information quality signals indicative of the quality of the signals of the respectively received satellites to the control device, and wherein the control device is responsive to the information quality signals for directing the position sensing devices to operate in the same reception mode; and a reception antenna coupled to an evaluation circuit for generating corrective data from reception of one or more radio waves from reference stations in known locations, wherein the control device is responsive to information regarding quality of the corrective data to improve accuracy of the position sensing devices, wherein the control device is operable to prompt the position sensing devices to use the same reception mode for the corrective data.

12. The system set forth in claim 11, wherein the position sensing devices of both vehicles include transmission structure for transmitting information regarding receivable satellite signals to the control device, the control device generating satellite signal information, wherein the position sensing devices are responsive to the satellite signal information to generate position data based substantially on only quality satellite signals commonly received by both the receivers.

13. The system set forth in claim 11, wherein the first and second sensing devices are operable to emit position signals based on all the receivable satellites.

14. The system set forth in claim 13, wherein the position signals based on all receivable satellites are used for absolute position data applications, including one or more of the following: automated steering of the first vehicle, harvest mapping processes, tillage operations, and spreading operations.

15. The system set forth in claim 11, wherein the control device receives position data from the first and second position sensing devices and compares the position data to generate a plausibility and/or imminent collision warning signal in the event of implausible position determinations and/or imminent vehicle collision, respectively.

16. The system set forth in claim 11 further comprising a corrective data link between the control device and at least one of the position sensing devices, the control data link providing corrective data for the position sensing devices.

17. The system set forth in claim 11 wherein the vehicles further comprise an automated speed control, and wherein the computer generates speed signals based on data regarding the relative position of the second vehicle to the first vehicle for providing a speed specification for an operator and/or for the automated speed control of the second vehicle.

18. The system set forth in claim 11, further comprising the computer generates steering signals based on data regarding the relative position of the second vehicle to the first vehicle for manually and/or automatically steering the second vehicle.

19. The system according to claim 1 wherein the same reception mode comprises a first reception mode specified by the control device using fewer than all satellite signals that can be received or a second reception mode specified by the control device using all satellite signals that can be received.

* * * * *